(12) United States Patent
Schäfer et al.

(10) Patent No.: US 12,545,594 B2
(45) Date of Patent: *Feb. 10, 2026

(54) PREPARATION OF NANOSTRUCTURED MIXED LITHIUM ZIRCONIUM OXIDES BY MEANS OF SPRAY PYROLYSIS

(71) Applicant: Evonik Operations GmbH, Essen (DE)

(72) Inventors: Durdu Schäfer, Rodgau (DE); Armin Wiegand, Grosskrotzenburg (DE); Harald Alff, Kahl (DE); Ryo Takata, Hanau (DE); Franz Schmidt, Frankfurt (DE)

(73) Assignee: Evonik Operations GmbH, Essen (DE)

( * ) Notice: Subject to any disclaimer, the term of this patent is extended or adjusted under 35 U.S.C. 154(b) by 957 days.

This patent is subject to a terminal disclaimer.

(21) Appl. No.: 17/641,960

(22) PCT Filed: Sep. 10, 2020

(86) PCT No.: PCT/EP2020/075279
§ 371 (c)(1),
(2) Date: Mar. 10, 2022

(87) PCT Pub. No.: WO2021/048251
PCT Pub. Date: Mar. 18, 2021

(65) Prior Publication Data
US 2022/0306485 A1  Sep. 29, 2022

(30) Foreign Application Priority Data
Sep. 13, 2019 (EP) .................... 19197280

(51) Int. Cl.
*C01G 25/02* (2006.01)
*H01M 4/36* (2006.01)
(Continued)

(52) U.S. Cl.
CPC ............ *C01G 25/02* (2013.01); *H01M 4/366* (2013.01); *H01M 4/485* (2013.01);
(Continued)

(58) Field of Classification Search
CPC ...... C01G 25/02; H01M 4/366; H01M 4/485; H01M 10/0525; H01M 10/0567;
(Continued)

(56) References Cited

U.S. PATENT DOCUMENTS 11,434,146 B2 * 9/2022 Kress .................. C01B 13/34
2008/0247931 A1 10/2008 Domesle et al.
(Continued)

FOREIGN PATENT DOCUMENTS

CN 101056818 A 10/2007
CN 102906023 A 1/2013
(Continued)

OTHER PUBLICATIONS

English machine translation of EP3085668A1 (2016).*
(Continued)

*Primary Examiner* — Richard M Rump
(74) *Attorney, Agent, or Firm* — Oblon, McClelland, Maier & Neustadt, L.L.P.

(57) ABSTRACT

The invention relates to a process for producing lithium zirconium mixed oxides by means of flame spray pyrolysis, mixed oxides obtainable by this process and their use in lithium ion batteries.

9 Claims, 3 Drawing Sheets

(51) Int. Cl.
  *H01M 4/485* (2010.01)
  *H01M 10/0525* (2010.01)
  *H01M 10/0567* (2010.01)

(52) U.S. Cl.
  CPC ... *H01M 10/0525* (2013.01); *H01M 10/0567* (2013.01); *C01P 2004/03* (2013.01); *C01P 2004/45* (2013.01); *C01P 2004/61* (2013.01); *C01P 2006/11* (2013.01); *C01P 2006/12* (2013.01)

(58) Field of Classification Search
  CPC .............. C01P 2004/03; C01P 2004/45; C01P 2004/61; C01P 2006/11; C01P 2006/12
  See application file for complete search history.

(56) References Cited

U.S. PATENT DOCUMENTS

| | | |
|---|---|---|
| 2013/0045158 A1 | 2/2013 | Katusic et al. |
| 2015/0024273 A1 | 1/2015 | Yamazaki et al. |
| 2015/0037677 A1 | 2/2015 | Koga et al. |
| 2017/0179544 A1 | 6/2017 | Lin et al. |
| 2019/0157667 A1 | 5/2019 | Yamazaki et al. |
| 2019/0280330 A1 | 9/2019 | Albano |
| 2019/0352189 A1 | 11/2019 | Kress et al. |
| 2020/0392014 A1* | 12/2020 | Libera .................. B01J 2/06 |
| 2022/0336841 A1 | 10/2022 | Schäfer et al. |

FOREIGN PATENT DOCUMENTS

| | | | |
|---|---|---|---|
| CN | 104160531 A | 11/2014 | |
| CN | 104169222 A | 11/2014 | |
| CN | 110167886 A | 8/2019 | |
| EP | 2 826 750 A1 | 1/2015 | |
| EP | 3085668 A1 * | 10/2016 | ............. C01G 53/50 |
| IN | 216KO2010 A * | 3/2010 | ............. C01G 25/00 |
| JP | 4982866 B2 | 7/2012 | |
| RU | 2008 101 421 A | 7/2009 | |
| RU | 2 486 130 C1 | 6/2013 | |
| RU | 2 639 872 C2 | 12/2017 | |
| RU | 2 693 858 C1 | 7/2019 | |
| WO | WO 2015/173114 A1 | 11/2015 | |

OTHER PUBLICATIONS

Lobintsev, Vyacheslav. Synthesis of Li-ion battery cathode materials by flame spray pyrolysis. MS thesis. NTNU, 2016.*
Milosevic, Olivera B., et al. "Aerosol route in processing of nanostructured functional materials." KONA Powder and particle Journal 27 (2009): 84-106.*
Chinese Office issued Dec. 28, 2023 in Chinese Application No. 202080063817.7, 9 pgs.
Chinese Office Issued Dec. 28, 2023 in Chinese Application No. 202080063817.7, 3 pgs.
European Search Report Issued Feb. 19, 2020 in European Application 19197280, filed Sep. 13, 2019 therein, 8 pages.
International Search Report & Written Opinion issued Sep. 28, 2020 in PCT/EP2020/075279 filed Sep. 10, 2020 therein, 14 pages.
Ruzica Djenadic, et al., "Nebulized spray pyrolysis of Al-doped $Li_7La_3Zr_2O_{12}$ solid electrolyte for battery applications", Solid State Ionics, vol. 263, Oct. 1, 2014, XP29035046, pp. 49-56.
Eongyu Yi, et al., "Flame made nanoparticles permit processing of dense, flexible, $Li^+$ conducting ceramic electrolyte thin films of cubic-$Li_7La_3Zr_2O_{12}$ (c-LLZO)†", Journal of Materials Chemistry A, 2016, XP55426349, pp. 12947-12954.

* cited by examiner

PREPARATION OF NANOSTRUCTURED MIXED LITHIUM ZIRCONIUM OXIDES BY MEANS OF SPRAY PYROLYSIS

FIELD OF THE INVENTION

The invention relates to a process for producing lithium zirconium mixed oxides by means of flame spray pyrolysis, mixed oxides obtainable by this process and their use in lithium ion batteries.

PRIOR ART

Secondary lithium ion batteries are one of the most important battery types currently used. The secondary lithium ion batteries are usually composed of an anode made of a carbon material or a lithium-metal alloy, a cathode made of a lithium-metal oxide, a liquid electrolyte in which a lithium salt is dissolved in an organic solvent and a separator providing the passage of lithium ions between the positive and the negative electrode during the charging and the discharging processes.

In endeavour to develop secondary batteries with improved intrinsic safety and energy density, the use of solid instead of liquid electrolytes has considerably progressed in the recent time. Such all-solid-state secondary lithium ion batteries should have good ion conductivity at an interface between an electrode active material and an electrolyte in order to have the required load characteristics. This high ion conductivity can be achieved by coating the surface of an active electrode material by some lithium-comprising compounds, such as $LiTi_2(PO_4)_3$, as described in JP 4982866 B2.

Mixed oxides comprising lithium find various applications in both solid state and liquid lithium ion batteries.

One of the general problems with cathode materials of lithium ion batteries is their rapid aging and thus the loss of performance during cycling. It is known that coating or doping of mixed lithium transition metal oxide particles with some metal oxides can inhibit unwanted reactions of the electrolyte with the electrode materials and thus improve the long-life stability of the lithium ion batteries.

Among other metal oxides, mixed oxides comprising zirconium have been reported for this purpose.

US2017179544A discloses preparation of lithium positive electrode materials doped with mixed metal oxides based on zirconium. Thus, in example 1 $Li_7La_3Zr_2Al_{0.07}O_{12.0105}$ was prepared by mixing the metal salts and sintering the mixture at 1200° C. for 10 hours, followed by dry mixing with a mixed lithium transition metal oxide $Li(Li_{10/75}N_{18/75}Co_{9/75}Mn_{38/75})O_2$ and subsequent heating at 900° C. for 20 hours to form a lithium positive electrode material. It is evident from this preparation procedure, that only large sized sintered particles of $Li_7La_3Zr_2Al_{0.07}O_{12.0105}$ could be used in this example.

Use of such relatively large metal oxide particles containing zirconium often leads to inhomogeneous distribution and large agglomerated metal oxide particles on the surface of core cathode material and as a result, minimal or no improvements in cycling performance are observed when compared with undoped or non-coated cathode materials.

Ceramic transactions (1997), 85, pp 55-66, describes preparation of a $Li_2ZrO_3$ powder with primary particles of less than 20 nm and BET surface area of 10-14 $m^2/g$ by a combustion process starting from aqueous solutions of zirconium and lithium nitrate precursors. Urea and citric acid are added to such an aqueous solution of metal precursors as fuels. Heating of the resulting mixture leads to complete evaporation of water, and subsequent combustion of metal precursors and the fuels. Although furnishing relatively small-sized metal oxide particles, this process is hardly industrially applicable, especially for continuous producing of large quantities of the corresponding lithium-zirconium mixed oxide.

Spray pyrolysis is a known method for producing relatively small metal oxide particles.

Spray pyrolysis and flame spray pyrolysis are established processes for producing simple metal oxides as well as complex mixed metal oxides. In spray pyrolysis, metal compounds in the form of fine droplets are introduced into a high-temperature zone where they are oxidized and/or hydrolysed to give metal oxides. A special form of this process is that of flame spray pyrolysis, in which the droplets are supplied to a flame which is formed by ignition of a fuel gas and an oxygen-containing gas.

IN2010K000216 describes a spray pyrolysis method for the synthesis of nanostructured lithium zirconate powder using aqueous-based precursor solutions. Thus, the examples of this patent application show the use of aqueous solutions of zirconium nitrate or zirconium oxynitrate, lithium nitrate and urea or glycine to prepare lithium zirconate with a BET surface area of 6-10 $m^2/g$ and tamped density of up to 1020 g/L.

Problem and Solution

The cited document of the prior art teaches manufacturing of the mixed lithium zirconium oxides by means of spray pyrolysis. However, the resulting products are reported to have relatively large tamped densities and relatively low BET surface area, suggesting relatively large aggregate particle size of such particles.

The problem addressed by the present invention is that of providing an improved method for industrial manufacturing mixed lithium zirconium oxides usable in lithium ion batteries, especially as coating or doping material for electrodes of lithium ion batteries, particularly cathodes, and as additives to electrolytes of lithium ion batteries.

Specifically, this method should provide metal oxide particles with relatively small particle size, high BET surface area and low tamped density.

In the course of thorough experimentation, it was surprisingly found that lithium zirconium mixed oxides with the desired particle properties can be prepared by means of the flame spray pyrolysis method when using a special combination of metal precursors and the solvents.

The Process for Producing Mixed Oxide

The invention provides a process for producing a lithium zirconium mixed oxide, by means of flame spray pyrolysis and optional further thermal treatment, characterized in that at least one solution of metal precursors, comprising
   a lithium carboxylate and/or a zirconium carboxylate, wherein each of these metal carboxylates contains 5 to 20 carbon atoms, and
   a solvent containing less than 5% by weight water, is used in the process.

The term "lithium zirconium mixed oxide" means in the context of the present invention a chemical compound or a mixture of chemical compounds, containing lithium (Li), zirconium (Zr) and oxygen (O) atoms.

During a flame spray pyrolysis process, the solution of metal compounds (metal precursors) in the form of fine droplets is introduced into a flame, which is formed by ignition of a fuel gas and an oxygen-containing gas, where the used metal precursors are oxidized and/or hydrolysed to give the corresponding metal oxides.

This reaction initially forms highly disperse approximately spherical primary metal oxide particles, which in the further course of the reaction coalesce to form aggregates. The aggregates can then accumulate into agglomerates. In contrast to the agglomerates, which as a rule can be separated into the aggregates relatively easily by introduction of energy, the aggregates are broken down further, if at all, only by intensive introduction of energy.

The produced metal oxides are referred to as "fumed" or "pyrogenically produced" metal oxides.

The flame spray pyrolysis process is in general described in WO 2015173114 A1 and elsewhere.

The flame spray pyrolysis preferably comprises the following steps:
a) at least one solution of metal precursors is atomized to afford an aerosol by means of an atomizer gas,
b) the aerosol is brought to reaction in the reaction space of the reactor with a flame obtained by ignition of a mixture of fuel gas and an oxygen-containing gas to obtain a reaction stream,
c) the reaction stream is cooled and
d) the solid metal oxide is subsequently removed from the reaction stream.

Examples of suitable fuel gases are hydrogen, methane, ethane, natural gas and/or carbon monoxide. It is particularly preferable to employ hydrogen. A fuel gas is employed in particular for embodiments where a high crystallinity of the metal oxides to be produced is desired.

The oxygen-containing gas is generally air or oxygen-enriched air. An oxygen-containing gas is employed in particular for embodiments where for example a high BET surface area of the metal oxide to be produced is desired. The total amount of oxygen is generally chosen such that, it is sufficient at least for complete conversion of the fuel gas and the metal precursors.

For obtaining the aerosol, the vaporized solution containing metal precursors can be mixed with an atomizer gas, such as nitrogen, air, and/or other gases. The resulting fine droplets of the aerosol preferably have an average droplet size of 1-120 μm, particularly preferably of 30-100 μm. The droplets are typically produced using single- or multi-material nozzles. To increase the solubility of the metal precursors and to attain a suitable viscosity for atomization of the solution, the solution may be heated.

Metal precursors employed in the inventive process include at least one lithium carboxylate and at least one zirconium carboxylates, each containing 5 to 20 carbon atoms.

The lithium and zirconium carboxylates used in the process according to the invention may independently of each other be a linear, branched or cyclic pentanoate (C5), hexanoate (C6), heptanoate (C7), octanoate (C8), nonanoate (C9), decanoate (D10), undecanoate (C11), dodecanoate (C12), tridecanoate (C13), tetradecanoate (C14), pentadecanoate (C15), hexadecanoate (C16), heptadecanoate (C17), octadecanoate (C18), nonadecanoate (C19), icosanoate (C20) of lithium and/or zirconium, and the mixtures thereof.

Most preferably, zirconium 2-ethylhexanoate (C8) and lithium neodecanoate (C10) are used.

The solvent used in the inventive process is preferably selected from the group consisting of alcohol, ether, ester, carboxylic acids, optionally halogenated hydrocarbon, and the mixtures thereof.

The alcohol can be selected from the group consisting of methanol, ethanol, n-propanol, iso-propanol, n-butanol, sec-butanol, tert-butanol, n-pentanol, n-hexanol, cyclohexanol, n-octanol, 2-ethylhexanol, n-decanol, neodecanol, and the mixtures thereof.

The ester can be alkyl ester of a carboxylic acid, such as ethyl acetate.

Carboxylic acid preferably contains 1-20 carbon atoms and is preferably selected from the group consisting of acetic acid, linear, branched or cyclic propionic acid (C3), butanoic acid (C4), pentanoic acid (C5), hexanoic acid (C6), heptanoic acid (C7), octanoic acid (C8), nonanoic acid (C9), decanoic acid (D10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), and the mixtures thereof.

Hydrocarbons can be linear, branched, cyclic aliphatic, aromatic or mixed aliphatic/aromatic. Suitable examples thereof include benzene, toluene, naphtha, and white spirit.

The examples of halogenated hydrocarbons include chloroform ($CHCl_3$), dichloromethane ($CH_2Cl_2$), carbon tetrachloride ($CCl_4$).

Most preferably, a mixture of a hydrocarbon and a carboxylic acid, e.g. of naphtha and 2-ethylhexanoic acid, is used as the solvent.

The solvent used in the present invention contains less than 5% by weight water, preferably less than 3% by weight water, more preferably less than 2% by weight water, even more preferably less than 1% by weight water, still more preferably less than 0.5% by weight water.

Most preferably, the solvent contains essentially no water, i.e. the water content in the solvent is less than 0.1% by weight, more preferably less than 500 ppm, even more preferably less than 200 ppm.

The total metal content in the solution of the metal precursors is preferably 1%-30% by weight, more preferably 2%-20% by weight, even more preferably 3%-15% by weight. Under "total metal content" is understood the total weight proportion of all metals contained in the metal precursors in the used solution of metal precursors.

The solvent mixture used for the inventive process may additionally comprise a chelating agent, i.e. a compound capable of forming two or more coordination bonds with metal ions. The examples of such chelating agents are e.g. diamines like ethylendiamine, ethylenediaminetetraacetic acid (EDTA), 1,3-dicarbonyl compounds such as acetyl acetone and alkyl acetyl acetate. Most preferably, acetyl acetone is used as such chelating agent.

It was observed that in the presence of such chelating agents, zirconium precursors, may show better solubility and no precipitation after a relatively long storage time.

The use of the special combination of metal carboxylates and the solvent with reduced water content according to the invention allows to ensure good solubility of the metal precursors and to achieve the desired metal oxide particle properties such as small particle size, high BET surface area and low tamped density.

The inventive process comprises an optional further thermal treatment of the mixed oxide prepared by flame spray pyrolysis process.

This further thermal treatment is preferably carried out at a temperature of 500° C.-1200° C., more preferably at 550° C.-1150° C., even more preferably at 600° C.-1100° C., still more preferably at 650° C.-1050° C.

The thermal treatment according to the inventive process allows obtaining a thermally treated mixed oxide with desirable properties, especially the desired chemical phases, crystalline structure etc. Thus, the thermally untreated lithium zirconium mixed oxide directly prepared by the flame spray pyrolysis, may contain a mixture of $ZrO_2$, $Li_2O$, $Li_2ZrO_3$ and other chemical compounds. Thermal treatment of this mixture at a temperature of about 600° C.-800° C. allows additional formation of a $Li_2ZrO_3$ and $Li_4Zr_3O_8$ phases so that this latter compound becomes a dominant chemical phase present in the thermally treated mixed oxide.

The Mixed Oxide

The mixed oxide prepared by the process according to the present invention preferably has a BET surface area of 0.1 $m^2/g$-100 $m^2/g$.

The thermally untreated mixed oxide, i.e. the product of the inventive process, wherein no further thermal treatment has been employed, preferably has a BET surface area of 5 $m^2/g$-100 $m^2/g$, more preferably of 7 $m^2/g$-70 $m^2/g$, most preferably of 15-50 $m^2/g$.

The thermally treated mixed oxide, i.e. the product of the inventive process, wherein a further thermal treatment has been employed, preferably has a BET surface area of less than 20 m2/g, more preferably 0.1 $m^2/g$-10 $m^2/g$, more preferably of 0.2 $m^2/g$-5 $m^2/g$, most preferably of 0.3-3 $m^2/g$.

The BET surface area can be determined according to DIN 9277: 2014 by nitrogen adsorption according to Brunauer-Emmett-Teller procedure.

The mixed oxide prepared by the process according to the invention, is usually in the form of aggregated primary particles with a numerical mean diameter of primary particles of 5-100 nm, preferably 7-70 nm, more preferably 10-50 nm, as determined by transition electron microscopy (TEM). This numerical mean diameter can be determined by calculating the average size of at least 500 particles analysed by TEM.

The numerical mean particle diameter of the (aggregated and agglomerated) mixed oxide $d_{50}$ is usually about 0.05 µm-2 µm, more preferably 0.05 µm-1 µm, even more preferably 0.05 µm-0.5 µm. This numerical mean diameter can be determined in a suitable dispersion, e.g. in an aqueous dispersion, by static light scattering (SLS) method.

The agglomerates and partly the aggregates can be destroyed e.g. by grinding or ultrasonic treatment of the particles to result in particles with a smaller particle size and a narrower particle size distribution.

Preferably, the mean particle diameter ds of the mixed oxide is 10-150 nm, more preferably 20-130 nm, even more preferably 30-120 nm, as determined by static light scattering (SLS) after 300 s of ultrasonic treatment at 25° C. of a mixture consisting of 5% by weight of the particles and 95% by weight of a 0.5 g/L solution of sodium pyrophosphate in water.

The span $(d_{90}-d_{10})/d_{50}$ of particles of the zirconium dioxide and/or of the mixed oxide comprising zirconium is preferably 0.4-1.2, more preferably 0.5-1.1, even more preferably 0.6-1.0, as determined by static light scattering (SLS) after 300 s of ultrasonic treatment at 25° C. of a mixture consisting of 5% by weight of the particles and 95% by weight of a 0.5 g/L solution of sodium pyrophosphate in water.

Thus, the mixed oxide prepared by the process of the present invention is preferably characterized by a relatively small particle size and narrow particle size distribution. This helps to achieve high-quality metal oxide doping and/or coating of the active electrode materials for lithium ion batteries.

The d values $d_{10}$, $d_{50}$ and $d_{90}$ are commonly used for characterizing the cumulative particle diameter distribution of a given sample. For example, the $d_{10}$ diameter is the diameter at which 10% of a sample's volume is comprised of smaller than $d_{10}$ particles, the $d_{50}$ is the diameter at which 50% of a sample's volume is comprised of smaller than ds particles. The $d_{50}$ is also known as the "volume median diameter" as it divides the sample equally by volume; the $d_{90}$ is the diameter at which 90% of a sample's volume is comprised of smaller than $d_{90}$ particles.

The mixed oxide prepared by the process according to the invention preferably has a tamped density of 20 g/L-1000 g/L.

The thermally untreated mixed oxide prepared by the process according to the invention preferably has a tamped density of 20 g/L-300 g/L, more preferably 30 g/L-270 g/L, even more preferably 40 g/L-250 g/L, still more preferably 50 g/L-200 g/L.

The thermally treated mixed oxide prepared by the process according to the invention preferably has a tamped density of 200 g/L-800 g/L, more preferably 250 g/L-750 g/L, even more preferably 300 g/L-700 g/L.

Tamped density of a pulverulent or coarse-grain granular material can be determined according to DIN ISO 787-11: 1995 "General methods of test for pigments and extenders— Part 11: Determination of tamped volume and apparent density after tamping". This involves measuring the apparent density of a bed after agitation and tamping.

The mixed oxide prepared by the inventive process is preferably hydrophilic in nature, that is not further treated by any hydrophobic reagents, such as silanes, after its synthesis by a flame spray pyrolysis process. The particles thus produced usually have a purity of at least 96% by weight, preferably at least 98% by weight, more preferably at least 99% by weight, wherein the 100% purity means that the mixed oxide contains only the specified metals and the oxygen. The mixed oxide may comprise hafnium compounds in the form of hafnium dioxide. The proportion of hafnium dioxide can be 1 to 4% by weight, based on $ZrO_2$. The content of chloride is preferably less than 0.5% by weight, more preferably less than 0.1% by weight, based on the mass of the mixed oxide powder. The proportion of carbon is preferably less than 2% by weight, more preferably 0.005%-1% by weight, even more preferably 0.01%-0.5% by weight, based on the mass of the mixed oxide powder.

The mixed oxide is preferably a compound of a general formula $$Li_aZr_bO_{0.5+2b},$$

wherein 0.5≤a≤12, preferably 2.0≤a≤8;

1.0≤b≤4.0, preferably 1.0≤b≤2.0;

Preferably, the composition of the mixed oxide of the present invention correspond to one of the formulas: $Li_2ZrO_3$, $Li_4Zr_2O_6$, $Li_4ZrO_4$, $Li_4Zr_3O_8$, $Li_6Zr_3O_9$, $Li_8ZrO_6$, most preferably $Li_2ZrO_3$.

The invention further provides lithium zirconium mixed oxide, wherein the mixed oxide is in the form of aggregated primary particles, has a BET surface area of 15-50 $m^2/g$, a numerical mean particle diameter of $d_{50}$=0.05-1 µm, as determined by static light scattering (SLS), and a tamped density of 50-200 g/L.

Such mixed oxide can be prepared by the inventive process, wherein no further thermal treatment is applied.

The invention further provides lithium zirconium mixed oxide,
wherein
the mixed oxide is in the form of aggregated primary particles,
has a BET surface area of less than 20 m²/g, preferably 0.1-20 m²/g,
a numerical mean particle diameter of $d_{50}$=1-50 µm, as determined by static light scattering (SLS), and
a tamped density of 200-800 g/L.

Such mixed oxide can be prepared by the inventive process, wherein a further thermal treatment is applied.

The invention further provides mixed oxide obtainable by the process according to the present invention.

Use of the Mixed Oxide in Lithium Ion Batteries

The invention further provides use of the mixed oxide according to the invention or the mixed oxide obtainable by the inventive process in lithium ion battery, particularly as a coating or doping material for electrodes of lithium ion batteries, especially cathodes, or as an additive to liquid, gel or solid-state electrolytes of lithium ion batteries.

The invention further provides lithium ion battery comprising the mixed oxide according to the invention or mixed oxide obtainable by the inventive process.

The lithium ion battery of the invention, apart from the active positive electrode (cathode), may contain an anode, a separator and an electrolyte comprising a compound comprising lithium.

The positive electrode (cathode) of the lithium ion battery usually includes a current collector and an active cathode material layer formed on the current collector.

The current collector may be an aluminium foil, copper foil, a nickel foil, a stainless-steel foil, a titanium foil, a polymer substrate coated with a conductive metal, or a combination thereof.

The active positive electrode materials may include materials capable of reversible intercalating/deintercalating lithium ions and are well known in the art. Such active positive electrode materials may include transition metal oxides, such as mixed oxides comprising Ni, Co, Mn, V or other transition metals and optionally lithium. The mixed lithium transition metal oxides used with preference as active positive electrode materials are selected from the group consisting of lithium-cobalt oxide, lithium-manganese oxide, lithium-nickel-cobalt oxides, lithium-nickel-manganese-cobalt oxides, lithium-nickel-cobalt-aluminium oxides, lithium-nickel-manganese oxides, or a mixture thereof. The mixed lithium transition metal oxide preferably has a general formula $LiMO_2$, wherein M is at least one transition metal selected from nickel, cobalt, manganese; more preferably M=Co or $Ni_xMn_yCo_z$, wherein 0.3≤x≤0.9, 0≤y≤0.45, 0≤z≤0.4.

The anode of the lithium ion battery may comprise any suitable material, commonly used in the secondary lithium ion batteries, capable of reversible intercalating/deintercalating lithium ions. Typical examples thereof are carbonaceous materials including crystalline carbon such as natural or artificial graphite in the form of plate-like, flake, spherical or fibrous type graphite; amorphous carbon, such as soft carbon, hard carbon, mesophase pitch carbide, fired coke and the like, or mixtures thereof. In addition, lithium metal or conversion materials (e.g. Si or Sn) can be used as anode active materials.

The electrolyte of the lithium ion battery can be in the liquid, gel or solid form.

The liquid electrolyte of the lithium ion battery may comprise any suitable organic solvent commonly used in the lithium ion batteries, such as anhydrous ethylene carbonate (EC), dimethyl carbonate (DMC), propylene carbonate, methylethyl carbonate, diethyl carbonate, gamma butyrolactone, dimethoxyethane, fluoroethylene carbonate, vinylethylene carbonate, or a mixture thereof.

The gel electrolytes include gelled polymers.

The solid electrolyte of the lithium ion battery may comprise oxides, e.g. lithium metal oxides, sulfides, phosphates, or solid polymers.

The liquid or gel electrolyte of the lithium ion battery usually contains a lithium salt. Examples of such lithium salts include lithium hexafluorophosphate ($LiPF_6$), lithium bis 2-(trifluoromethylsulfonyl)imide (LiTFSI), lithium perchlorate ($LiClO_4$), lithium tetrafluoroborate ($LiBF_4$), $Li_2SiF_6$, lithium triflate, $LiN(SO_2CF_2CF_3)_2$ lithium nitrate, lithium bis(oxalate)borate, lithium-cyclo-difluoromethane-1,1-bis(sulfonyl)imide, lithium-cyclo-hexafluoropropane-1,1-bis(sulfonyl)imide and mixtures thereof.

The lithium ion battery, especially the one with liquid or gel electrolyte, can also comprise a separator, which prevents the direct contact between the two electrodes, which would lead to the internal short circuit.

The material of the separator may comprise a polyolefin resin, a fluorinated polyolefin resin, a polyester resin, a polyacrylonitrile resin, a cellulose resin, a non-woven fabric or a mixture thereof. Preferably, this material comprises a polyolefin resin such as a polyethylene or polypropylene based polymer, a fluorinated resin such as polyvinylidene fluoride polymer or polytetrafluoroethylene, a polyester resin such as polyethylene terephthalate and polybutylene terephthalate, a polyacrylonitrile resin, a cellulose resin, a non-woven fabric or a mixture thereof.

EXAMPLES

Commercial mixed lithium nickel manganese cobalt oxide powder NMC (7-1.5-1.5) (Type PLB-H7) with a BET surface area of 0.30-0.60 m²/g, a medium particle diameter $d_{50}$=10.6±2 µm (determined by static laser scattering method), was supplied by Linyi Gelon LIB Co.

Commercial lithium zirconium oxide power LZO (type 2004PR) with a BET surface area of lower than 1 m²/g, a medium particle diameter $d_{50}$=19.3±2 µm (determined by static laser scattering method), was supplied by Sigma Aldrich.

Comparative Example 1

(L-Zr Mixed Oxide from Aqueous Nitrate Precursors)

8.54 kg of an aqueous solution containing 630 g of $LiNO_3$ and 1733 g of $Zr(NO_3)_4$ (metal content: 24 wt %) was prepared under intense stirring until al solid content was dissolved. This solution represents the theoretical composition of $Li_2ZrO_3$.

An aerosol was formed of 2.5 kg/h stream of this solution and 15 $Nm^3$/h stream of air via a two-component nozzle and sprayed into a tubular reaction with a burning flame. The burning gases of the flame consist of 13 $Nm^3$/h hydrogen and 75 $Nm^3$/h of air. Additionally, 25 $Nm^3$/h of secondary air was used. After the reactor the reaction gases were cooled down and filtered.

The particle properties are shown in Table 1.

Preparation of an NMC Powder Coated with Li—Zr Mixed Oxide of Comparative Example 1:

The NMC-powder (99 g) was mixed with 1.0 g (1 wt %) of the fumed powder of the comparative example 1 in a high intensity laboratory mixer (Somakon mixer MP-GL with a 0.5 L mixing unit) at first for 1 min at 500 rpm (specific electrical power: 350 W/kg NMC) to homogeneously mix the two powders. Afterwards the mixing intensity was increased to 2000 rpm (specific electrical power: 800 W/kg NMC, tip-speed of the mixing tool in the mixing unit: 10 m/s) and the mixing was continued for 5 min to achieve the dry coating of the NMC particles by the fumed powder of the comparative example 1.

Comparative Example 2

(LU-Zr Mixed Oxide from Ethanolic Nitrate Precursors)

8.32 kg of an ethanoic solution containing 450 g of $LiNO_3$ and 1238 g of $Zr(NO_3)_4$ (metal content: 24 wt %) was prepared under intense stirring until al solid content was dissolved. This solution represents the theoretical composition of $Li_2ZrO_3$.

An aerosol was formed of 2.5 kg/h stream of this solution and 15 $Nm^3$/h stream of air via a two-component nozzle and sprayed into a tubular reaction with a burning flame. The burning gases of the flame consist of 6.8 $Nm^3$/h hydrogen and 75 $Nm^3$/h of air. Additionally, 25 $Nm^3$/h of secondary air was used. After the reactor the reaction gases were cooled down and filtered.

The particle properties are shown in table 1.

Example 1

7.94 kg of a solution containing 2725 g of a commercial solution (Borchers® Deca Lithium2), containing 2 wt % lithium in the form of lithium neodecanoate and 2984 g of a commercial solution (Octa Solingen Zirconium 12), containing 12 wt % Zr in the form of zirconium ethylhexanoate, and 2231 g 2-ethylhexanoic acid, were mixed, resulting in a clear solution. This solution represents the theoretical composition of $Li_2ZrO_3$.

An aerosol was formed of 2.5 kg/h stream of this solution and 15 $Nm^3$/h stream of air via a two-component nozzle and sprayed into a tubular reaction with a burning flame. The burning gases of the flame consist of 4 $Nm^3$/h hydrogen and 75 $Nm^3$/h of air. Additionally, 25 $Nm^3$/h secondary air was used. After the reactor the reaction gases were cooled down and filtered.

Figure 1A:
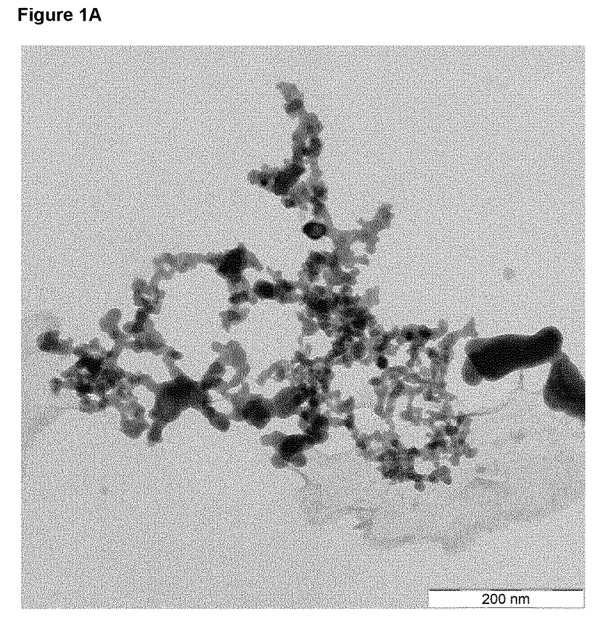
FIGS. 1A and 1B are TEM images of Li—Zr mixed oxide particles prepared as described in example 1.
Figure 1B:
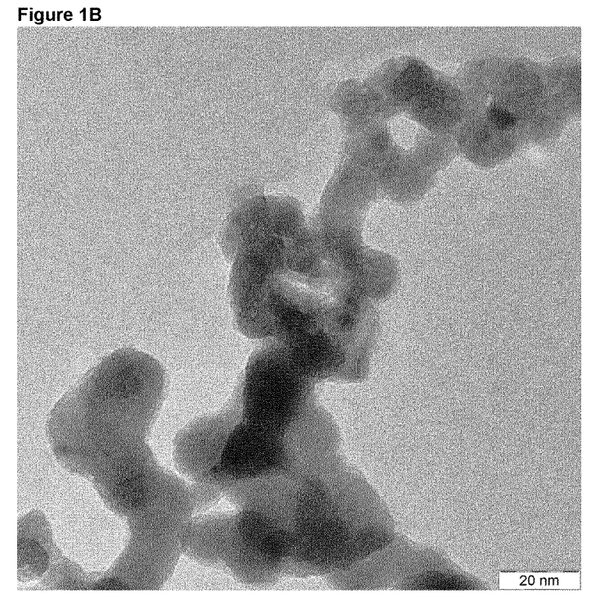

The particle properties are shown in table 1. The TEM images of the particles are shown in FIGS. 1A and 1B.

Figure 5:
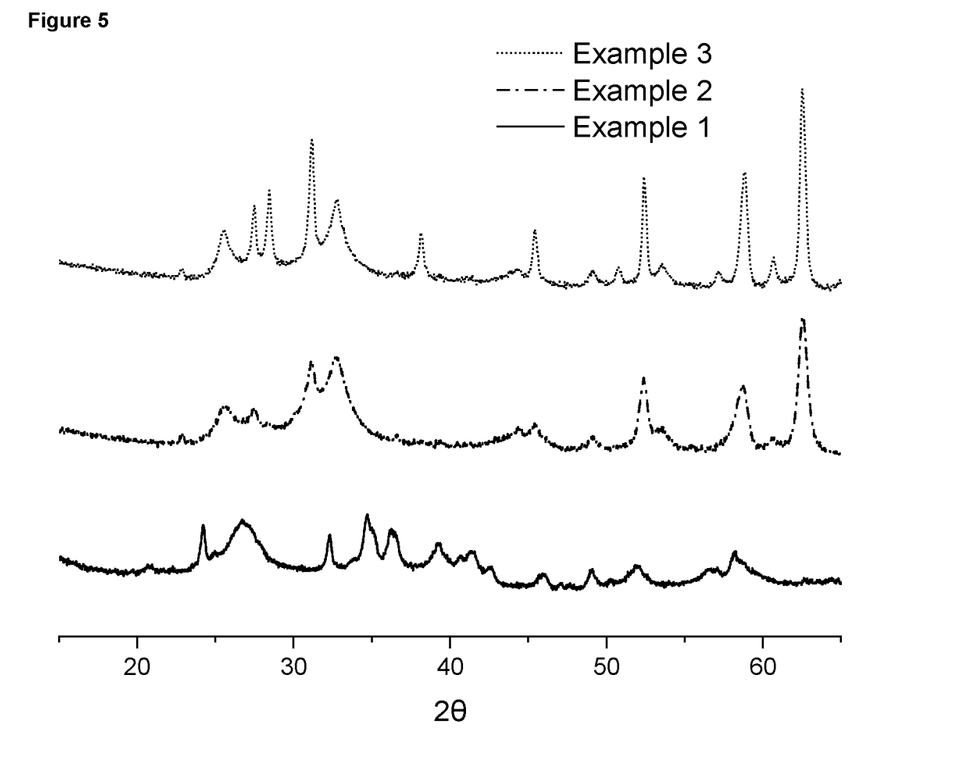
FIG. 5 shows XRD patterns of the inventive Li—Zr mixed oxide (LZO) prepared as described in examples 1-3.

The XRD analysis (FIG. 5) showed, that the major phase of the product was still $ZrO_2$ structure.

Example 2

(Calcined Li—Zr Mixed Oxide)

The mixed oxide obtained in example 1 was calcined at 700° C. for 6 h in a rotary kiln. The XRD analysis (FIG. 5) showed, that the major phase of the product was the tetragonal lithium zirconium oxide ($Li_4Zr_3O$) structure.

Example 3

(Calcined Li—Zr Mixed Oxide)

The mixed oxide obtained in example 1 was calcined at 750° C. for 6 h in a rotary kiln. The XRD analysis (FIG. 5) showed, that the major phase of the product was monoclinic lithium zirconium oxide ($LiZrO_3$) and tetragonal lithium zirconium oxide ($Li_4Zr_3O_8$) structure.

Preparation of an NMC Powder Coated with Li—Zr Mixed Oxide of Example 1:

The NMC-powder (99 g) was mixed with 1.0 g (1 wt %) of the fumed powder of the Example 1 in a high intensity laboratory mixer (Somakon mixer MP-GL with a 0.5 L mixing unit) at first for 1 min at 500 rpm (specific electrical power: 350 W/kg NMC) to homogeneously mix the two powders. Afterwards the mixing intensity was increased to 2000 rpm (specific electrical power 800 W/kg NMC, tip-speed of the mixing tool in the mixing unit: 10 m/s) and the mixing was continued for 5 min to achieve the dry coating of the NMC particles by the fumed powder of the Example 1.

Figure 2:
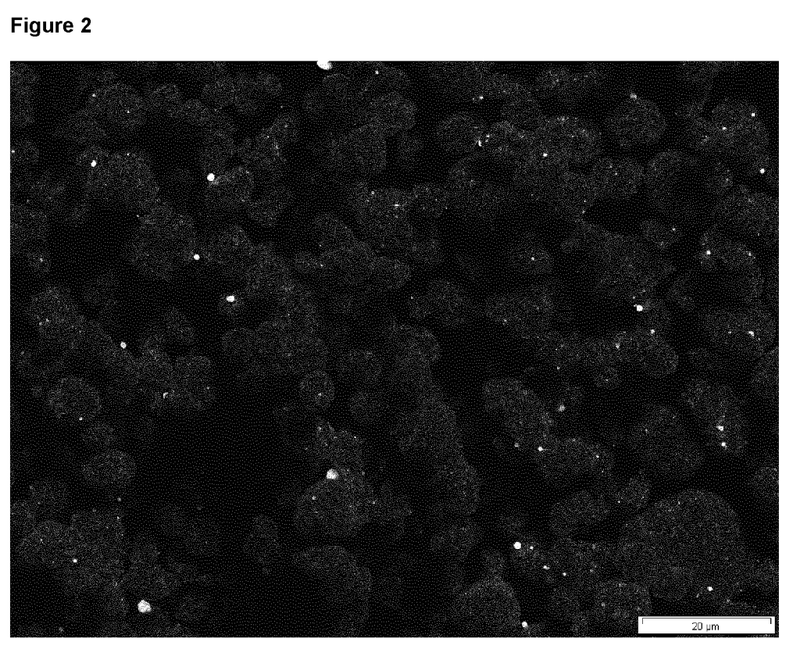
FIG. 2 shows SEM-EDX mapping image of Zr (white) on LZO-coated NMC prepared using LZO prepared as described in example 1.
Figure 3:
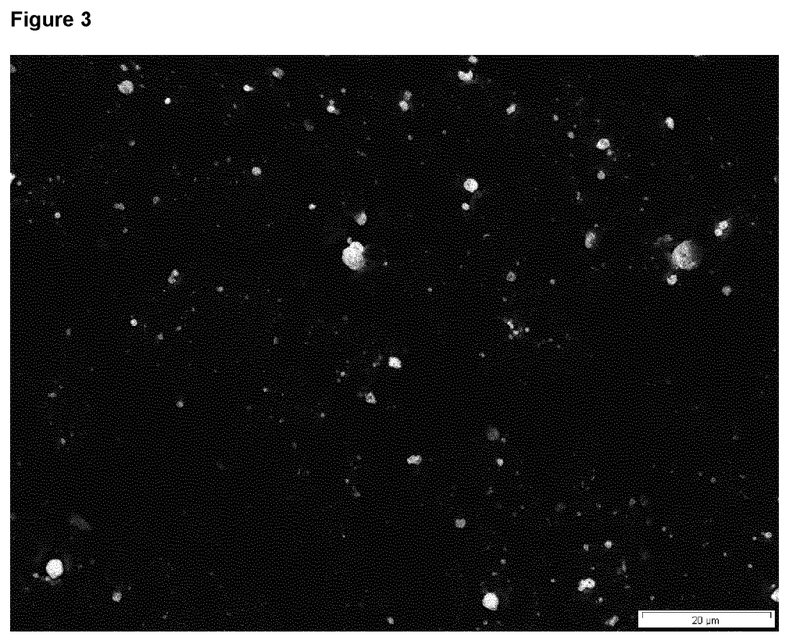
FIG. 3 shows SEM-EDX mapping image of Zr (white) on LZO-coated NMC prepared using LZO prepared as described in comparative example 1.

Analysis of $Li_2ZrO_3$-Dry Coated Mixed Lithium Transition Metal Oxides by SEM-EDX FIG. 2 shows the SEM-EDX mapping of Zr (white) on $Li_2ZrO_3$ (LZO)-coated NMC prepared by using fumed nano LZO (Example 1), FIG. 3 shows the results of the analysis of NMC coated with fumed coarse LZO (Comparative Example 1). The axes of FIGS. 2 and 3 show: x axis=diameter of particles; the left y axis=volume in %, the right y axis=cumulative volume in %. NMC mixed oxide dry coated with fumed nano LZO (Example 1), shows a full and homogeneous coverage of al NMC particles with LZO (FIG. 2). No larger LZO agglomerates were detected, showing a good dispersibility of nanostructured fumed nano LZO. Additionally, no free unattached LZO-particles next to the NMC particles were found, indicating the strong adhesion between coating and the substrate (NMC). In contrast, FIG. 3 shows that only the fine LZO-particles of fumed coarse LZO are attached to the surface of NMC particles. The larger LZO-particles are non-dispersed and are therefore unattached, located next to the NMC particles. As a result, the NMC particles are not fully covered by zirconium oxide.

Figure 4:
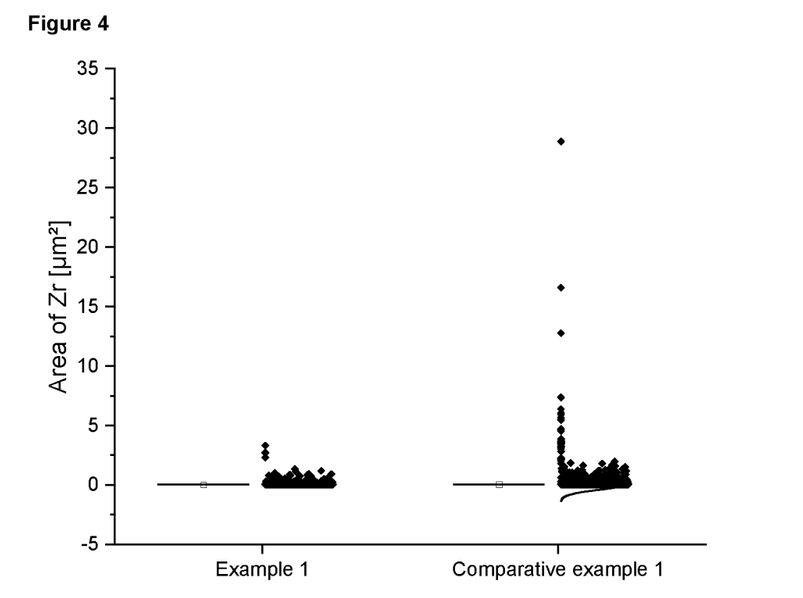
FIG. 4 shows the statistical analyses of the area distribution of Zr in the SEM-EDX mapping images of LZO-coated NMC prepared using LZO prepared as described in comparative example 1 and example 1.

FIG. 4 shows the statistical analyses of FIG. 2 and FIG. 3. The area distribution of Zr (white) $\mu m^2$ in the SEM-EDX mapping is further analyzed by box normal plot and showing a clear difference of the dispersibility of Zr (white) between Example 1 in FIG. 2 and Comparative Example 1 in FIG. 3.

Assembly & Characterizations of all-Solid-State Lithium Metal Batteries

Three sets of al-solid-state NMC_$Li_6SP_5Cl$_Li metal batteries that were assembled using fumed nano LZO (Example 1) and commercial LZO from Sigma Aldrich. Composite cathode using LZO coated NMC was prepared with the weight ratio of NMC:$Li_6SP_5Cl$:Carbon=60:35:5 as cathode. Li—In alloy is used as anode.

The initial impedance was analyzed by electrochemical impedance spectroscopy (EIS) and the results are shown in the table 2. Table 2 also show the initial coulombic efficiency of the al-solid-state batteries.

TABLE 1

Properties of the lithium-zirconium mixed oxides

| Example | BET [m²/g] | D10 [μm] | D50 [μm] | D90 [μm] | Tamped density [g/L] |
|---|---|---|---|---|---|
| Comparative Example 1 | 28 | 0.61 | 2.54 | 5.18 | 301 |
| Comparative Example 2 | 17 | 0.14 | 1.05 | 3.24 | 333 |
| Example 1 | 25 | 0.06 | 0.13 | 2.65 | 104 |
| Example 2 | 13 | 0.06 | 0.086 | 2.60 | 350 |
| Example 3 | 4.6 | 0.106 | 5.12 | 104 | 739 |

TABLE 2

Electrochemical analyses of all-solid-state batteries

| Example | Impedance [Ω] | Initial coulombic efficiency [%] |
|---|---|---|
| Without coating | 1237 | 62.55 |
| Coating with Example 1 | 139 | 64.46 |
| Coating with commercial LZO | 164 | 63.46 |

The invention claimed is:

1. A method of producing a lithium zirconium mixed oxide by flame spray pyrolysis, the method comprising:
spray pyrolyzing a solution of a metal precursor, comprising
a metal carboxylate selected from the group consisting of a lithium carboxylate and a zirconium carboxylate, each metal carboxylate comprising a carboxylate comprising 5 to 20 carbon atoms, and
a solvent comprising less than 5% by weight water,
wherein the lithium zirconium mixed oxide is a compound of the following formula wherein
0.5≤a≤12, and
1.0≤b≤4.0.

2. The method of claim 1, wherein the spray flame pyrolysis comprises:
atomizing the solution of a metal precursor using an atomizer gas to afford an aerosol,
reacting the aerosol in a reaction space of a reactor with a flame obtained by ignition of a mixture of fuel gas and an oxygen-containing gas to obtain a reaction stream,
cooling the reaction stream, and
removing the lithium zirconium mixed oxide from the reaction stream.

3. The method of claim 1, wherein the lithium zirconium mixed oxide has a BET surface area of from 0.1 to 100 m²/g.

4. The method of claim 1, wherein each carboxylate is, independently of each other, selected from the group consisting of linear, branched and cyclic pentanoate (C5), hexanoate (C6), heptanoate (C7), octanoate (C8), nonanoate (C9), decanoate (D10), undecanoate (C11), dodecanoate (C12), tridecanoate (C13), tetradecanoate (C14), pentadecanoate (C15), hexadecanoate (C16), heptadecanoate (C17), octadecanoate (C18), nonadecanoate (C19), and icosanoate (C20).

5. The method of claim 1, wherein the solvent is at least one selected from the group consisting of an alcohol, an ether, an ester, a carboxylic acid, and a halogenated hydrocarbon.

6. The method of claim 1, wherein the solution of a metal precursor further comprises a chelating agent selected from the group consisting of a diamine and a 1,3-dicarbonyl compound.

7. The method of claim 1, wherein the lithium zirconium mixed oxide has a numerical mean particle diameter $d_{50}$ of from 0.05 to 1 μm, as determined by static light scattering (SLS).

8. The method of claim 1, wherein the lithium zirconium mixed oxide has a tamped density of from 20 to 1000 g/L.

9. The method of claim 1, further comprising thermally treating the lithium zirconium mixed oxide at a temperature of from 500° C. to 1200° C.

* * * * *